C. LONG.
OIL PUMP.
APPLICATION FILED OCT. 9, 1918.
1,377,895.
Patented May 10, 1921.
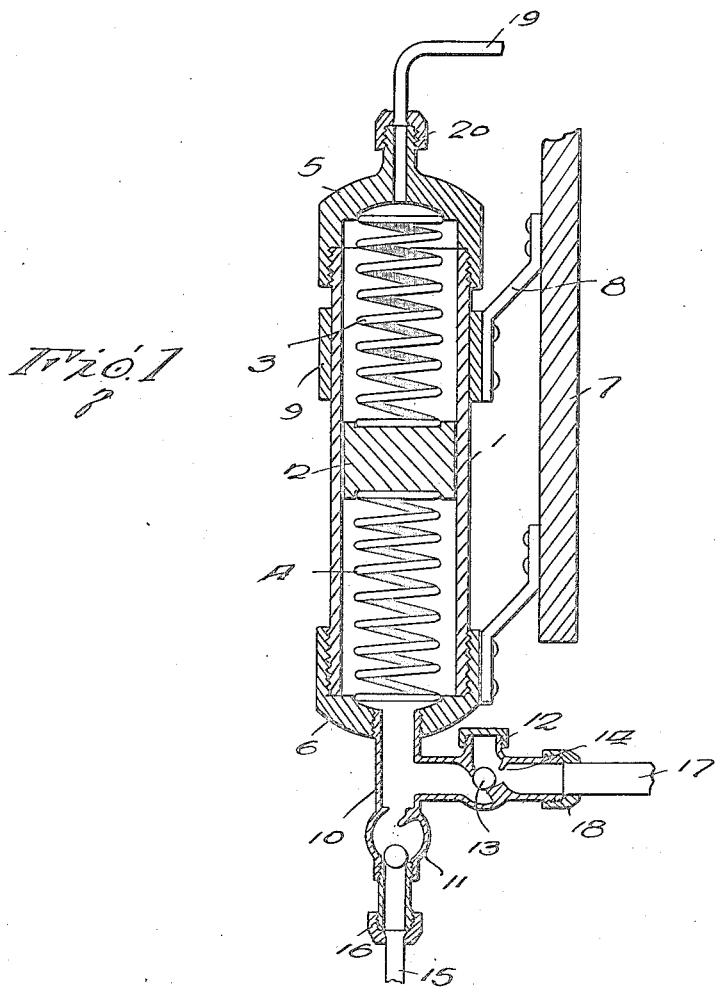
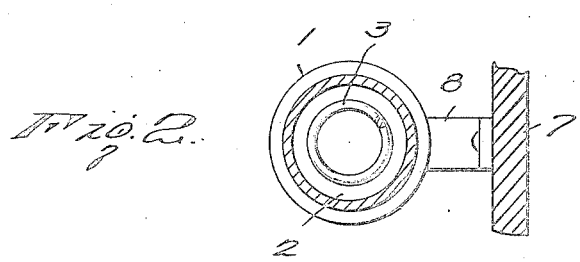

UNITED STATES PATENT OFFICE.

CHARLES LONG, OF JEFFERSONVILLE, INDIANA, ASSIGNOR OF ONE-HALF TO FRANK GARNER, OF JEFFERSONVILLE, INDIANA.

OIL-PUMP.

1,377,895. Specification of Letters Patent. Patented May 10, 1921.

Application filed October 9, 1918. Serial No. 257,464.

*To all whom it may concern:*

Be it known that I, CHARLES LONG, a citizen of the United States, residing at Jeffersonville, in the county of Clark and State of Indiana, have invented certain new and useful Improvements in Oil-Pumps, of which the following is a specification.

This invention relates to improvements in pumps and it is the principal object of the invention to provide an oil pump particularly adapted for use in connection with internal combustion engines and operable by the intermittent introduction of compressed gases from the engine cylinders thereinto, the size of the pump being such as will not materially affect the power of the engine by reason of the loss of a portion of the compressed gases.

Another and equally important object of the invention is to provide a pump of the character mentioned which does not depend upon any connections with the power transmitting means of an engine or motor for operation and which is, by reason of its mode of operation, effectual and positive in the performance of its functions.

Other objects will be in part obvious and in part pointed out hereinafter.

The improvements in the details and arrangement of parts will be apparent from an inspection of the accompanying drawings when considered in connection with the specific description hereinafter contained and wherein a preferred embodiment of the invention is shown for the purpose of imparting a full understanding thereof.

In the drawings:

Figure 1 is a vertical section through the improved pump, and

Fig. 2 is a horizontal section therethrough.

Referring now more specifically to the drawings, in connection with which like reference characters will designate corresponding parts throughout the several views of the drawings, 1 represents the cylinder of the pump and 2 the plunger which is slidably arranged therein and is normally maintained at a point intermediate the ends of said cylinder by means of coil springs 3 and 4, these springs, obviously, having their opposite ends engaged with heads 5 and 6 turned into engagement with the screw threaded portions formed on the opposite extremities of said cylinder 1. As will be noted, the opposite sides of the plunger 2 may be and preferably are formed with seats whereby to receive the adjacent convolutions of the several coil springs 3 and 4 to prevent undue movement of shifting of the same with relation thereto and in consequence, insure proper functioning thereof.

To support the pump with relation to the dashboard 7 of a motor driven vehicle or with relation to any object, brackets 8 are employed, one thereof being engaged in a suitable manner with the head 7 while the other bracket is engaged with a sleeve 9 encircling the upper portion of the cylinder 1 and fixed thereto in a suitable manner. Obviously, by so engaging the remaining bracket 8 with the sleeve 9, removal of the head 5 from the upper end of the cylinder 1 will be permitted whereby to facilitate the repairing or substitution of parts of the pump.

Turned into engagement with an opening formed in the head 6 is a Y-branch or conduit 10, one of the extremities thereof being formed with a substantially spherical valve cage 11 while the remaining extremity is formed with a screw threaded neck over which a closure cap 12 may be placed. Valve seats are formed in each of the free extremities of the Y-branch 10 and receive spherical valves 13 thereon, movement of the valves with relation to their seats being limited by suitable forms of stops 14 carried by said extremities on their inner sides. Connected to the extremity formed with the valve cage 11 through the medium of a union 16 is a conduit 15, said conduit extending into engagement with the oil supply reservoir of the engine. A second conduit 17 is connected by means of a union to the remaining free extremity of the Y-branch 10 and has connection with the mechanism to receive the oil pumped by the improved device from the reservoir through the conduit 15.

As means for effecting connection between the pump cylinder and one cylinder of an internal combustion engine, another conduit 19 is connected with the head 5 by means of a union 20 and of course has communication with the interior of said cylinder. Connection between the conduit 19 and the engine cylinder can be made, if desired, through the priming cock of the cylinder or by removing the spark plug from this particular cylinder and engaging a suitable form of connection therein, which connection is in turn connected to the adjacent end of said conduit 19.

In operation, as the gases are intermittently compressed in the engine cylinder, a portion of the same will be conveyed through the conduit 19 to the upper portion of the cylinder 1 and directed onto the adjacent side of the plunger 2, forcing said plunger downwardly against the tension of the spring 4. Upon continued functioning of the piston in the particular cylinder of the engine connected to the pump, the compression of the gases in the pump cylinder 1 will of course be reduced whereupon said plunger 2 will be forced upwardly by reason of its engagement with the upper convolution of the spring 4 thus creating a suction stroke and drawing oil from the oil reservoir through the conduit 15 to a point beyond the particular valve located in the adjacent extremity of the Y-branch 10. Hence, when compressed gases are again introduced into the cylinder 1, the downward movement of the plunger 2 caused thereby will in turn cause the accumulated oil in the branch 10 to be discharged through the conduit 17 into the mechanism for receiving such oil, passage of the oil into the conduit 17 by the particular check valve connected thereto being permitted by reason of the manner of seating of the valve.

While I have hereinbefore stated that the pump is especially adapted for use in connection with internal combustion engines, it will be of course readily appreciated that the device can be used in connection with various forms of motors relying upon forms of compression for the generation of the power produced thereby. Further, the connections of the pump can be varied to meet certain conditions peculiar to different types of engines or motors, such as conditions or preference may dictate.

Manifestly, the construction shown is capable of considerable modification and such modification as is within the scope of my claim, I consider within the spirit of my invention.

I claim:

A pump of the class described comprising a cylinder having removable heads provided with apertures of different sizes, a motive fluid conduit connected with the smaller aperture and a pump fluid conduit with the larger, said last mentioned conduit having valve equipped inlet and outlet branch pipes, a stemless piston operable in said cylinder and normally in neutral position midway the ends of the cylinder, a coiled spring on either side of said piston bearing against the piston and the opposed cylinder head, said springs operating as shock absorbers for the piston and one of them as means for returning the piston to neutral position after actuation.

In testimony whereof, I affix my signature hereto.

CHARLES LONG.